L. H. McKEE.
SCHOOL DESK.
APPLICATION FILED DEC. 17, 1918.

1,355,404.

Patented Oct. 12, 1920.
2 SHEETS—SHEET 1.

INVENTOR.
Louis H. McKee.
BY Diedersheim & Fairbanks
ATTORNEYS

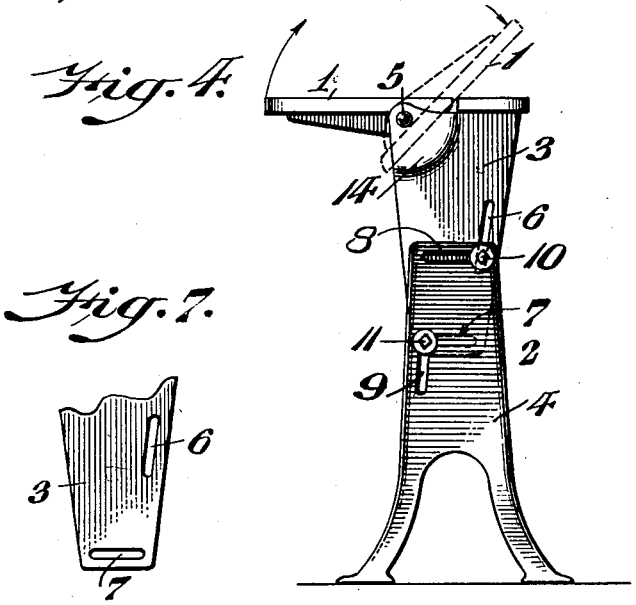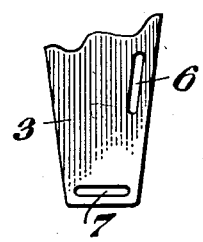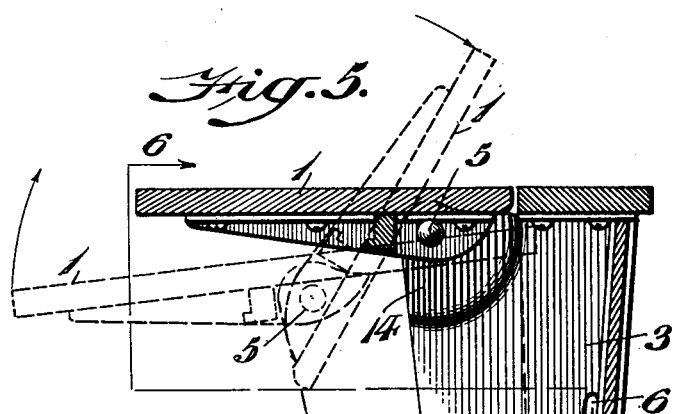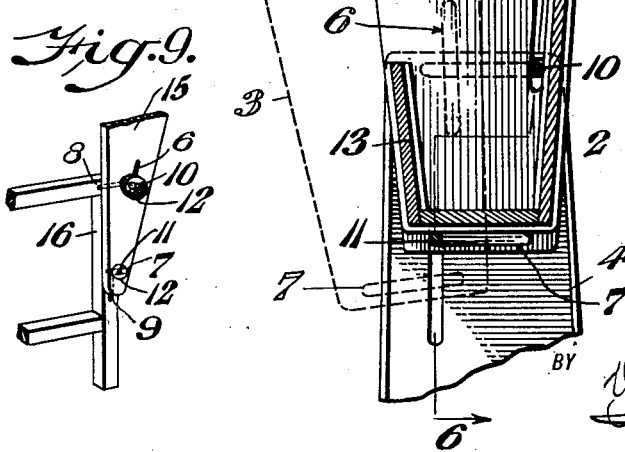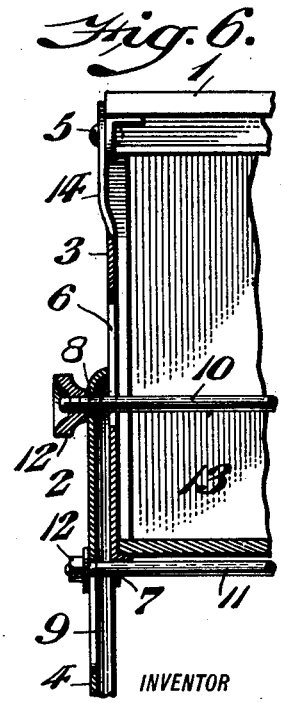

UNITED STATES PATENT OFFICE.

LOUIS H. McKEE, OF TRENTON, NEW JERSEY.

SCHOOL-DESK.

1,355,404.　　　　Specification of Letters Patent.　　Patented Oct. 12, 1920.

Application filed December 17, 1918. Serial No. 267,116.

*To all whom it may concern:*

Be it known that I, LOUIS H. McKEE, a citizen of the United States, residing at Trenton, in the county of Mercer, State of New Jersey, have invented a new and useful School-Desk, of which the following is a specification.

My invention relates to a school desk having a service top which may be adjusted in various slanted positions, adjusted in height, and placed nearer to or farther from a pupil, and provision is made for rendering the ingress and egress of the pupil to and from the seat most convenient, the means employed and the operation thereof being hereinafter set forth.

The invention is satisfactorily illustrated in the accompanying drawing but the important instrumentalities thereof may be varied, and so it is to be understood that the invention is not limited to the specific details shown and described, as long as they are within the spirit or scope of the claims.

Fig. 4 represents a side elevation thereof.

Fig. 5 represents a vertical section of a portion thereof on an enlarged scale.

Fig. 6 represents a vertical section of a portion thereof at a right angle to Fig. 5.

Fig. 7 represents a side elevation of a portion of the upper member or section of a side supporting standard of the desk top on the scale Fig. 4.

Fig. 9 represents a perspective view of another embodiment of the invention.

Fig. 8 represents a side elevation of a portion of a lower member of said standard on the scale Fig. 4.

Similar numerals of reference indicate corresponding parts in the figures.

Figure 1:
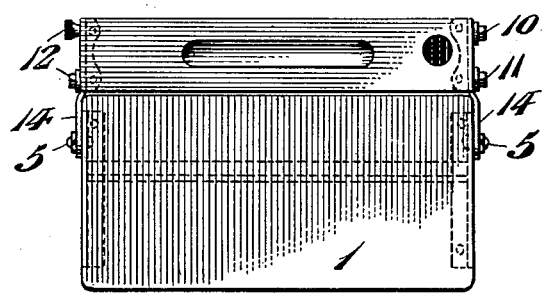
Figure 1 represents a top or plan view of a school desk embodying my invention.
Figure 2:
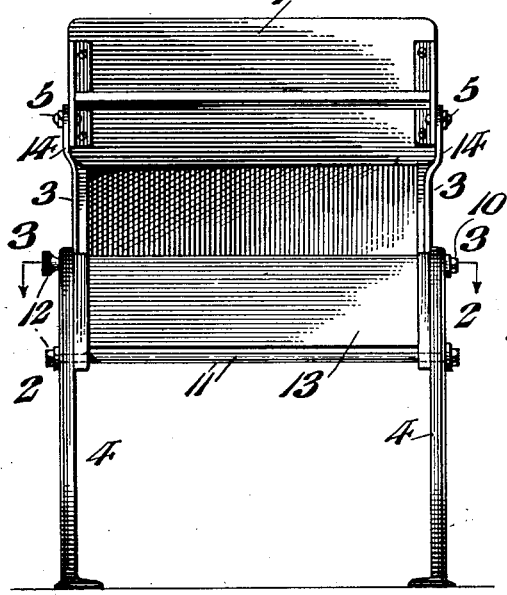
Fig. 2 represents a rear view thereof.
Figure 3:
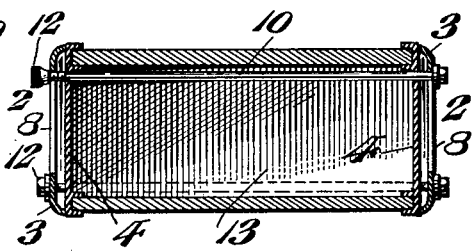
Fig. 3 represents a transverse section thereof on line 3—3 Fig. 2.

Referring to the drawings.

1 designates the service top of a school or other desk, and 2 designates side supporting standards of said top, they being formed of upper and lower members 3 and 4 respectively, said top being pivotally mounted as at 5 on the upper members 3 of said standards whereby as is evident said top may be placed at various inclinations or slants relative to the requirements of the pupil who is using the desk.

In about the middle portions of the members 3 are the vertically extending slots 6, and below the same are the horizontally extending slots 7.

In the top portion of the member 4 is the horizontally extending slots 8, and below the same are the vertically extending slots 9. Passing through the slots 6 and 8 which are in register is the guiding and clamping bolt 10.

Passing through the slots 7 and 9 which are in register is the guiding and clamping bolt 11, said bolts 11 and 10 having on their threaded ends suitable nuts 12 whereby the contiguous members 3 and 4 may be tightly clamped together as one.

It will be seen that when the bolts are loosened, the members 3 may be lowered or raised so as to adjust the top 1 vertically to a height required by the pupil of the desk, the bolts playing in the vertical slots of the members 3 and 4 to permit the said adjustment of said top.

Again owing to the horizontal slots, the upper members 3 may be moved toward and from the pupil and so adjusted to the requirements of the latter; and said members may be turned on the bolts 11 and also placed in further inclined or slanted positions, a form of which is shown in dotted lines Fig. 5, thus adapting the top to be further adjusted in inclined or slanting positions, a form of which is also shown in dotted lines in said Fig. 5.

After the desired positions are established, the bolts may be tightened when the parts in question retain their adjustment.

It is evident that owing to the adjustments of parts as stated, the top may be set to a proper slant, and height, as may be desired by a pupil to a proper and variable distance to and from the eye of a pupil, and to a proper angle with the line of vision of the pupil and provision is made for the ingress and egress of the pupil to and from the seat of the desk in an easy manner.

The opposite standards form a frame between which is placed the receptacle 13 for books, slates, clothing, etc., the same being secured to proper portions of the frame in any suitable manner, it being open at the top and is most convenient of access.

In practice the standards are formed of suitable sheet metal struck up or stamped into shape, and the ears 14 which receive the axial pins or rivets which comprise the axis of the top 1 are integral with the members 3 of said standards.

In Fig. 9, I show a standard such as 15 as attached to the side 16 of a chair thus providing a single support for the top of a desk. In this case said standard and side of the chair are provided with slots and bolts permitting the operation of said standard and the adjustment of the desk top as hereinbefore stated, this construction being serviceable for persons who are crippled in their lower extremities.

Having thus described my invention what I claim as new and desire to secure by Letters Patent, is:—

1. A school desk having a service top, and a supporting standard therefor, the latter being formed of separate sections with means adapting the standard to be adjusted in vertical and horizontal directions and held thereat and render said top adjustable in said directions in accordance with said standard, said means permitting of such adjustment without withdrawal of said means.

2. A school desk having a service top and a supporting standard therefor, said standard being formed of separate sections, and means on said sections permitting the standard to be adjusted in vertical, horizontal and angular directions without withdrawal of said means, the said top being pivotally mounted on one of the standard sections.

3. A school desk having a service top and an adjustable supporting standard therefor formed of separate sections which are provided respectively with vertically and horizontally extending slots, and complementary clamping and guiding bolts adapted to occupy registering slots of contiguous sections.

4. A school desk having a service top and an adjustable supporting standard therefor formed of separate sections which are provided respectively with vertically and horizontally extending slots, and complementary clamping and guiding bolts on the separate sections of the standard adapted to occupy registering slots of contiguous sections, said top being adapted to be slantingly adjustable on said standard.

LOUIS H. McKEE.

Witnesses:
Wm. C. Witte,
Guy C. Oliphant.